United States Patent [19]

Iguchi

[11] 4,026,873

[45] May 31, 1977

[54] NEEDLE-LIKE CRYSTALS OF POLYOXYMETHYLENE AND METHOD FOR MANUFACTURE THEREOF

[75] Inventor: Masatoshi Iguchi, Yamato, Japan

[73] Assignee: Agency of Industrial Science & Technology, Tokyo, Japan

[22] Filed: Dec. 17, 1975

[21] Appl. No.: 641,762

Related U.S. Application Data

[63] Continuation-in-part of Ser. No. 454,924, March 26, 1974, abandoned.

[30] Foreign Application Priority Data

Apr. 21, 1973 Japan .............................. 48-45616

[52] U.S. Cl. ............................ 260/67 FP; 260/340
[51] Int. Cl.² .................. C08G 2/10; C07D 323/06
[58] Field of Search ................................ 260/67 FP

[56] References Cited

UNITED STATES PATENTS

| | | | |
|---|---|---|---|
| 2,989,508 | 6/1961 | Hudgin | 260/67 FP |
| 2,989,510 | 6/1961 | Bruni | 260/67 FP |
| 3,156,671 | 11/1964 | Suter et al. | 260/67 FP |
| 3,200,096 | 8/1965 | Hudgin | 260/67 FP |
| 3,242,063 | 3/1966 | Okamura et al. | 260/67 FP X |
| 3,438,883 | 4/1969 | Marans et al. | 260/67 FP X |
| 3,839,290 | 10/1974 | Babare et al. | 260/67 FP |

*Primary Examiner*—Lucille M. Phynes
*Attorney, Agent, or Firm*—Oblon, Fisher, Spivak, McClelland & Maier

[57] ABSTRACT

Needle-like single-crystals of polyoxymethylene are obtained directly from a monomer, trioxane, in the course of polymerization in solution. The method for obtaining the crystals comprises preparing an anhydrous, dilute solution of trioxane in non-polar solvents, adding thereto a specified amount of boron trifluoride or its ether complex derivatives as catalyst and subsequently adding a small specified amount of water as co-catalyst, and maintaining the mixture unstirred at a fixed temperature.

The needle-like crystals, measuring 5 to 100 microns long and 1 to 3 microns across, are single crystals having a hexagonal cross-section and constituted of molecular chains extended and aligned in the direction of length with full three dimensional regularity. This single-crystal is believed to be the first example of a 'polymer whisker'.

7 Claims, 4 Drawing Figures

100μm　FIG.1A
10μm　FIG.1B

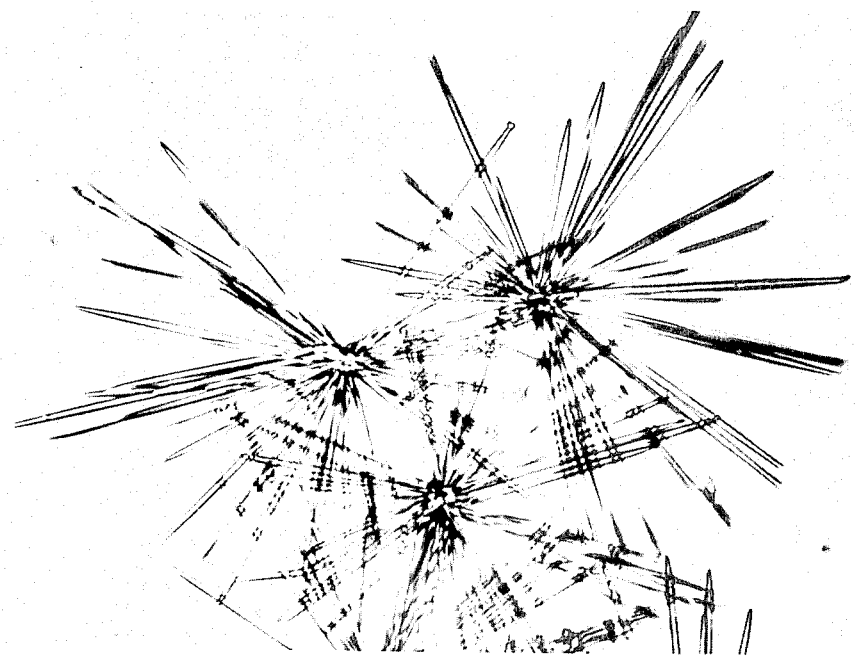
FIG.2A
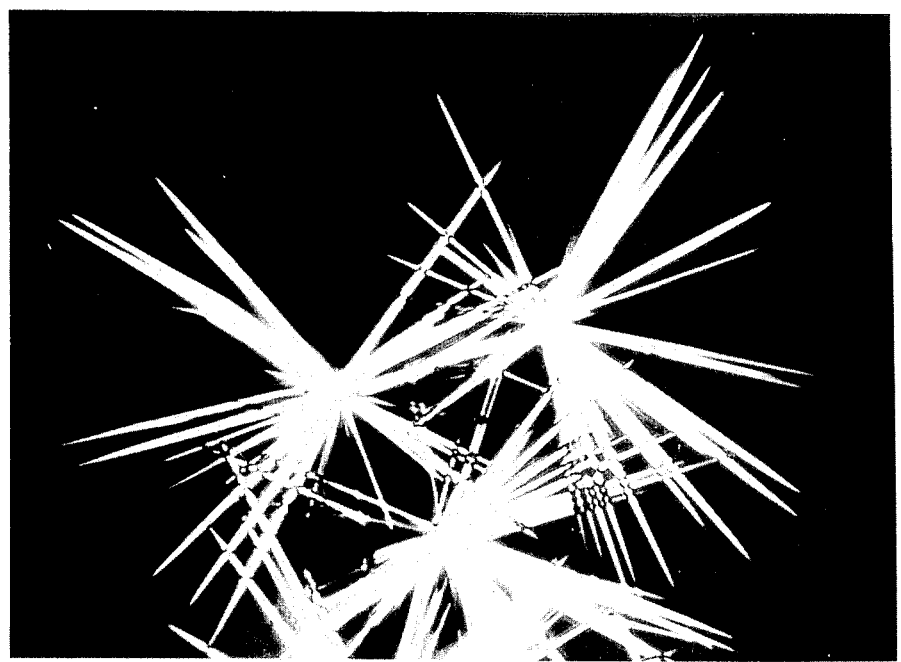
FIG.2B  |←25μm→|

NEEDLE-LIKE CRYSTALS OF POLYOXYMETHYLENE AND METHOD FOR MANUFACTURE THEREOF

REFERENCE TO COPENDING APPLICATION

This is a continuation-in-part application of my now abandoned application U.S. Ser. No. 454,924 filed Mar. 26, 1974.

BACKGROUND OF THE INVENTION

This invention relates to a method of obtaining needle-like single-crystals of polyoxymethylene directly from a monomer, trioxane, in a polymerization system and to the needle-like single-crystals of polyoxymethylene manufactured thereby.

The fact that trioxane polymerizes and gives high molecular-weight polyoxymethylene by cationic catalysis or radioactive irradiation is quite well known and various techniques for carrying out the polymerization process have been patented. In these patented techniques attention has been paid mostly to the productivity or the efficiency of the reaction and to the basic nature of the resultant polymer (e.g., to its average molecular weight). The structure of the polymer as polymerized has not been the main point of interest, because polymers are generally fabricated into the required shapes (fibre, film, etc.) after they are produced.

It should be emphasized that the present invention is not aimed at improving conventional techniques but at growing, directly from the monomer, needle-like crystals of polyoxymethylene, which are readily useful in their own shape with no further processing. To this end, it is critically important to select and control conditions so that the chemical reactions (i.e., the initiation and the propagation of polymerization) should take place in exact harmony with the physical phenomena (i.e., the nucleation and the growth of crystals).

Below are mentioned a number of patented methods, more or less relevant to the present application. The novelty of the present invention over each patented method is clear from the accompanying comments.

U.S. Pat. No. 2,989,510 describes a method of polymerizing trioxane in non-polar solvents, e.g., cyclohexane, with boron trifluoride dibutyl-ether as catalyst. The method uses the monomer at fairly high concentrations (35% or above) and, after initiating the reaction by adding the catalyst, the polymerization is conducted at a temperature below or very close to the precipitation temperature of the monomer. The system is said to be anhydrous and the role of water, which is of vital importance in the present invention, is not mentioned. The method itself is very similar to that reported by Baccaredda et al (J. Polymer Sci. 44, 266 (1963)) and has been pointed out to be virtually the same as a catalytic solid-state polymerization (Iguchi et al, Brit. Polymer J. 3, 177 (1971)). The product is considered to bear a fibrous morphology similar to that obtained by gamma-ray induced solid-state polymerization (see below). A similar method is also described in U.S. Pat. No. 3,156,671 for the copolymerization of trioxane with a small amount of ethylene oxide.

U.S. Pat. No. 3,156,671 points out the effect of water acting in conjunction with boron trifluoride, and discloses a process for the polymerization of trioxane in solution. Cyclohexane is used as solvent, boron trifluoride is used as catalyst and the polymerization temperature is not permitted to fall below 60° C so that the reactants remain in liquid phase. At first glance, this appears similar to the method of the present invention. However, the patented method uses very high monomer concentration (trioxane/cyclohexane weight ratio, as large as 1.5 to 1), which is obviously too concentrated for the purpose of the present invention. Furthermore, the polymerization is a co-polymerization with ethylene oxide and the incorporation of such foreign units along the molecular chain, even if the amount is small, is hazardous for the formation of neat (defectless) single-crystals such as obtained by the present invention.

The so-called solid-state polymerization induced by radioactive irradiation is another popular means used to convert trioxane to polyoxymethylene (U.S. Pat. Nos. 3,242,063 and 3,438,883). A typical procedure comprises preparing of monomer crystals, introducing of randomly distributed reactive cites by gamma-ray irradiation, and causing the polymerization to proceed in the interior of the monomer crystals. This method gives rise to fibrous products consisting of numerous bundle-like crystallites (less than several tens of Angstroms in diameter), the major portion of which align along one particular crystallographic axis of the monomer and the minor portion of which align along another. The product may be a form of slender fibre but is classified as a multi-crystal which contains a considerable fraction of unreacted monomer. Removal of the monomer gives porous structures.

One object of the present invention is to provide a method for obtaining needle-like single-crystals of polyoxymethylene directly from trioxane.

Another object of the present invention is to provide needle-like single-crystals of polyoxymethylene which are hexagonal in cross-section and are constituted of molecular chains extended and aligned in the direction of the length with full three dimensional regularity.

BRIEF SUMMARY OF THE INVENTION

In the method for producing needle-like single-crystals of polyoxymethylene in accordance with the present invention, trioxane monomer of very high purity is dissolved in an anhydrous non-polar solvent, and boron trifluoride or its ether complex derivative and water are thereafter added to the resulting solution. The amount of boron trifluoride or its ether complex derivative per liter of solution is required to be in the range of $2 \times 10^{-4}$ to $1 \times 10^{-2}$ mol as boron trifluoride and the amount of water must be in the range of $1 \times 10^{-5}$ to $2.5 \times 10^{-4}$ mol. Furthermore, the amount of boron trifluoride must be at least twenty times that of water in terms of molar ratio.

The solution so prepared is held unstirred at a constant reaction temperature between 30° and 65° C to precipitate needle-like single-crystals of polyoxymethylene which are then separated as the product.

The needle-like single-crystals obtained by the method of this invention measure 5 to 100 microns long and 1 to 3 microns across, are hexagonal in cross-section and are constituted of molecular chains extended and aligned in the direction of length with full three dimensional regularity.

BRIEF EXPLANATION OF THE DRAWINGS

FIG. 1(A) is a low-magnification scanning-type electron-micrograph of clusters of needle-like single-crystals of polyoxymethylene according to this invention.

FIG. 1(B) is a high-magnification scanning-type electron-micrograph of needle-like single-crystals of polyoxymethylene according to this invention.

FIG. 2(A) is an optical micrograph under normal light of clusters of needle-like single-crystals of polyoxymethylene according to this invention.

FIG. 2(B) is an optical micrograph of clusters of needle-like single-crystals of the polyoxymethylene according to the present invention as interposed between crossed polarizers.

DETAILED DESCRIPTION OF THE INVENTION

Described briefly, the formation of needle-like single-crystals of polyoxymethylene having hexagonal cross-section is accomplished by preparing an anhydrous, dilute solution of trioxane in a non-polar solvent, adding thereto boron trifluoride (or its ether complex derivative) and subsequently adding a small amount of water, and maintaining the system unstirred at a fixed temperature. However, this invention relates not only to the conversion of trioxane into polyoxymethylene but also to the "nature imitating art" of simultaneously growing the resultant polymer in the form of needle-like single-crystals which are readily useful without refabrication. The conditions are therefore selected and controlled carefully in favour of the crystal growth, although polymerization itself without regard to the as-polymerized structure is possible over a broader range of conditions.

The monomer, trioxane, used in the present invention should be purified and be made free of any acidic species which, if present, may cause so-called spontaneous polymerization. Addition of co-monomers, e.g., ethylene oxide, must be avoided since such a foreign unit incorporated along the molecular structure can cause a defect in the crystal and jeopardize the formation of the single-crystal itself.

It is essential to select a solvent which has small affinity for the initial product as well as the polymer. Thus, the reactive species generated in the initial stage of the reaction (from $BF_3$, $H_2O$ and trioxane) should precipitate instantaneously, forming reactive crystalline nuclei (and, of course, the polymer should not dissolve). It is a basic requirement that the solvent be inert to the reaction and not cause any side-reaction (chain-transfer, termination etc.). From this point of view, such non-polar solvents as follows are suitable: aliphatic hydrocarbons such as pentane, hexane, heptane and octane, alicyclic hydrocarbons such as cyclopentane and cyclohexane, and hydrocarbon mixtures such as petroleum ether or ligroin.

The monomer concentration in the solvent is not critical as far as the polymerization mechanism itself is concerned. It should, however, not be too high since it is preferable to keep the rate of polymerization at a reasonably low level and also to avoid the mutual impingement of growing bodies (crystals). Practically, the concentration is desired to fall in the range between 1 and 20g/100ml solvent, preferably between 2 and 10g/100ml solvent.

Preparation of a very pure monomer solution is essential to the reaction. The solution must contain absolutely no extraneous substance which causes side reaction. In particular, the water content should be reduced to well below one part per million so as to enable the reaction to be triggered later upon the addition of (a measured amount of) water. A good method for preparing such monomer solution is as follows. Purified trioxane is dissolved in cyclohexane and refluxed in the presence of a drying agent (such as sodium wire, sodium or calcium hydride, lithium aluminium hydride, etc.) and the solution is directly distilled into a reaction vessel. (Although trioxane has a boiling point which is much higher than that of the solvent, it is effectively transferred as azeotrope.)

The reaction is catalyzed by two species, $BF_3$ (neat or in the form of ether complex) and $H_2O$, added separately preferably in this order. The role of water is very significant. If the system is sufficiently dry, the system shows virtually no change by the addition of $BF_3$, and the subsequent introduction of $H_2O$ causes instantaneous clouding, indicating the initiation of the reaction. The amounts of $BF_3$ (or its ether complex) and water suitable for the present purpose of growing needle-like single-crystals are from $2 \times 10^{-4}$ to $1 \times 10^{-2}$ mol/l, and from $1 \times 10^{-5}$ to $2.5 \times 10^{-4}$ mol/l, respectively. It is, however, very important to use the former in a large excess against the latter, and the molar ratio of $BF_3/H_2O$ should be greater than 20. (Theoretically, the active species for this type of polymerization is considered to be in the form, $H^+ BF_3OH^-$, i.e., the equimolar product of $BF_3$ and $H_2O$. When $BF_3$ is used in the form of ether complex, ether is no more than a dummy for the reaction and is liberated on addition of $H_2O$.) Polymerization itself is possible over a wide range of catalytic ratios, but the morphology of the resultant polymer varies as follows.

| $BF_3/H_2O$ : | | |
|---|---|---|
| | greater than 20 | needle-like crystals |
| | 0.3 – 20 | heterogeneous products |
| | 0.1 – 0.3 | feather-shaped plate-like crystals or rod-like crystals, co-existing with heterogeneous and amorphous product |
| | less than 0.1 | amorphous products of low molecular weight oligomers |

To facilitate handling of such a small amount of water with respect to the scale of the entire system it is convenient to use 'moist air' as the source of water. This is also advantageous in that it provides an easy means for quick dispersion of water molecules into the solution.

The temperature should be high enough to prevent trioxane from precipitating out of the solution. The suitable temperature range is roughly between 30° and 65° C. If the temperature is too high, the balance between polymerization and crystal growth is destroyed and the reaction proceeds in favour of the former.

The solution should be brought to the reaction temperature prior to the addition of the catalysts. After each addition of $BF_3$ or water, the solution is immediately stirred or agitated for a few seconds to homogenize the system. But after the dispersion of the water, the system should be kept strictly unstirred at a constant temperature throughout the reaction. If the system is stirred or the temperature fluctuates significantly, the steady growth with needle-like habit is no longer maintained, giving rise to irregularly shaped products. The reaction time depends on the monomer concentration, the amount of catalysts ($BF_3$ and $H_2O$), the temperature and the desired needle length. Under typical conditions (using 7.2g (0.08 mol) trioxane dissolved in 200ml cyclohexane, 10cc ($4\times10^{-4}$ mol) of $BF_3$ and 10cc moist air (equivalent to $1 \times 10^{-5}$mol $H_2O$) at 50° C) the needle-like crystals should grow to a length of 30 – 100 microns within 20 hours at the yield of more than 60%.

At the end of the reaction time, the reaction should be terminated and the catalytic species be killed by adding weak bases such as triethylamine, pyridine etc. The product may be collected and washed, e.g. on a Buchner's funnel, but should not be pressed so as to avoid destruction or deformation. (Mechanical force tends to fibrilize the needle-like crystals along their length. See below.)

The needle-like crystals of polyoxymethylene produced in accordance with this invention by the method described above are generally 5 – 100 microns in length and 1 – 3 microns across and are single-crystals having a hexagonal cross-section in which the molecular chains are extended and aligned in the direction of length with full three dimensional regularity. Preparation of longer crystals is possible by the same method.

As shown in FIG. 1, the needle-like crystals obtained in accordance with this invention are unique in structure being formed in clusters each comprising many needles radiating from a common center. The size of the crystals as well as the yield varies depending upon such conditions as the concentration of the monomer, the amount of catalyst and water used and the reaction temperature and time. The degree of purity of the system and the scale of the system are also important factors. Even in a single batch of products there may be some distribution in length and the needles grown around the internal wall of the vessel are normally of lower grade than those grown in the central part of the vessel. However, the whole product is characterized by the needle-like feature and no other morphologies are developed.

As clarified in the following description, the needle-like crystals are believed to be whisker-type single-crystals having a hexagonal cross-sectional shape, in which molecular chains are extended and oriented along the length with full three dimensional regularity. The properties of the crystals, as described below, do not vary with change in the size, i.e., the size of the crystal is large enough to give consistent values in ordinary physical measurements.

A scanning-type electron micrograph of the product of the reaction (FIG. 1(A)) shows that it has an appearance similar to that of a torn mass of filter paper and consists of clusters of needles, all of the same type and 30 – 100 microns long and 1 – 3 microns across. The needles of each cluster radiate from a common center. In larger magnification (FIG. 1(B)), it is seen that the needles are quite straight (and obviously hexagonal) and sharp-pointed towards the tips, bearing the typical whisker-type habit which is common with those from metals and simple substances. That the shape of the cross-section is hexagonal, reflecting the hexagonal packing of molecules in the crystalographic unit-cell structure, has been proved by the observation of replicas by a common-type electron microscope. The crystal morphology is consistent throughout the whole product.

A set of optical micrographs are shown in FIG. 2. Under normal light (a), each crystal appears to be quite transparent, also suggesting that the needle is a single-crystal involving no substantial defects. Between cross-polarizers (b), the needles show a strong birefringence along the length. The color appearance with a 530nm test plate is blue when the needle is set along the $z'$-axis and yellow along the $x'$-axis, indicating the molecular orientation to be parallel with the direction of the length.

The crystallinity of the needle-like crystals was investigated by the X-ray diffraction method. Very sharp crystalline reflections appeared on a smooth background in the diagram, and the calculated degree of crystallinity was virtually 100%, whereas a polyoxymethylene-diacetate resin (brought in for reference) showed 62% crystallinity under the same measuring conditions. The density of the crystals, measured by both floating and volume-exclusion methods, agreed exactly with the theoretical density (calculated from the crystallographic unit-cell and the Avogadro number) again confirming the defectless structure.

The crystals are thermally stable despite the fact that the chain end is not blocked as in the case of commercial polyoxymethylene resins. When heated mildly, the crystals remain undecomposed until the melting point is approached. Thermal analysis with a differential calorimeter at the heating rate of 10° C/min. revealed that the crystals possess a sharp melting endotherm between 181° and 198° C, the peak temperature being at 191° – 192° C. The melting temperature is much higher than those of around 175° C for folded-chain crystals (ordinary polyoxymethylene samples). Around the melting peak temperature, the polymer of which the crystal is comprised tends to decompose, liberating formaldehyde from the chain ends. If the polymer crystal is once melted, the needle-like structure is not reproduced upon cooling. The common folded-chain structure results instead.

The needle-like crystal has much smaller affinity for solvents than ordinary polyoxymethylene samples. This can be attributed to the characteristically smooth surface structure. When the polymer crystal is heated in p-chlorophenol containing 2% alpha-pinene, a common solvent for polyoxymethylene, the polymer crystals are neither dissolved nor even caused to swell to around ca. 150° C, while ordinary polyoxymethylene samples dissolve easily below ca. 120° C. The polymer crystal dissolves, however, in hexafluoroacetone sesquihydrate buffered with 1% triethylamine at room temperature.

The needle-like crystals are very hard to break up mechanically normal to the length. Theoretically, a high tensile modulus, or strength 10 to 50 times larger than an ordinary fiber of the same diameter, is expected. (The crystal tends to fibrilize along the length upon deformation.) Thus, the needle-like crystals obtained by the present invention are expected to be useful, e.g., as fillers for strengthening plastics and other substances in the manufacture of composite materials.

EXAMPLE 1

Needle-like crystals of polyoxymethylene were prepared by the following procedure. Commercial trioxane was recrystallized twice from cyclohexane solution after refluxing in the presence of sodium wire and stored in a desicator over potassium hydroxide. 7.2g (0.08mol) of the purified trioxane was dissolved in 250ml of pure cyclohexane (UV grade) and, after refluxing with a small amount of lithium aluminum hydride (drying agent) for several hours, a 200ml portion of the solution was distilled directly into the reaction vessel (a flask), in the atmosphere of dry argon throughout. The flask was sealed with a silicon-rubber stopper and maintained at 50° C by a thermostat. Then, through the silicon-rubber stopper, 10cc ($4 \times 10^{-4}$ mol) of gaseous boron trifluoride followed by 10cc moist air (equivalent to $1 \times 10^{-5}$ mol $H_2O$) was added from separate syringes. After each addition, the flask was shaken for a few seconds to homogenize the mixture. The flask was replaced in the thermostat and left to stand strictly unstirred for 20 hours. The turbidity appeared immediately after the addition of water, indicating the initiation/nucleation, and developed into a loose aggregate of white precipitate. After the reaction was terminated by adding a small quantity of triethyl amine, the precipitate was collected on a Buchner's funnel and washed repeatedly with ethanol, water, and acetone with no pressing. After drying, the product weighed 4.6g (representing a conversion ratio of 65%).

The morphology of the product was needle-like crystals as mentioned above with reference to FIG. 1 and FIG. 2. The length of the crystals was distributed between ca. 30 and 100 microns, while the width was ca. 1 to 3 microns. The X-ray measurement showed virtually 100% crystallinity and the density measured, $1.49_3 - 1.49_7$, agreed with the theoretical density, $1.49_2$. The melting endotherm measured by differential scanning calorimetry (heating rate: 10° C/min.) was observed between 181° – 198° C, the peak temperature being at 191.5° C. The specific viscosity measured in hexafluoroacetone sesquihydrate containing 1% triethylamine at 30° C was 1.46 for 0.4% solution ($\eta_{sp}/c=3.65$), indicating that the polymer has a fairly high molecular weight, although quantitative evalation was not possible due to the decomposition observed by the fall of the viscosity with the elapse of time.

The needle-like crystals thus obtained were embedded in two kinds of regins (epoxy type and cyanoacrylate type) and hard composite materials were obtained. When the composites were broken mechanically and the fracture surfaces were observed by means of a scanning-type electron micrograph, it was found that the needles had not been broken normal to the direction of length. The tips of the needles frequently slipped out of the matrix.

EXAMPLE 2

The procedure of Example 1 was repeated with purified n-hexane in place of cyclohexane. After 18 hours of reaction time, 3.2g (45% conversion) of needle-like crystals of polyoxymethylene, 10 to 50 microns long, were obtained. The structure and properties were virtually the same as those in Example 1.

EXAMPLE 3

This example summarizes a series of experiments which shows the relation between the conversion, needle length and reaction time. Experiments were carried out by a method similar to Example 1.

| Number | Time (hours) | Conversion (%) | Needle length (microns) |
|---|---|---|---|
| 106 | 2.5 | 14.3 | 3 – 10 |
| 107 | 5 | 20.8 | 5 – 15 |
| 108 | 10 | 37.1 | 10 – 20 |
| 109 | 20 | 60.5 | 15 – 30 |

Monomer : 7.2g/200ml cyclohexane
$BF_3$ : $4 \times 10^{-4}$ mol
$H_2O$ : $1 \times 10^{-5}$ mol

EXAMPLE 4

This example extracts and summarizes the results of experiments in which the relation between the amount of the two catalytic components, namely the $BF_3/H_2O$ molar ratio, and the resultant morphologies are shown. Monomer solution, 0.40mol trioxane/1,000ml cyclohexane, was prepared as in Example 1 and distributed into 20ml portions in the atmosphere of dry argon. The reaction temperature and the reaction time were fixed at 50° C and 20 hours, respectively.

| No. | $BF_3$ or $BF_3OEt_2$ (mol $\times 10^{+5}$) | $BF_3/H_2O$ ratio (mol/mol) | Morphology[c] | Conversion (%) |
|---|---|---|---|---|
| 251 | 4.5[a] | 45 | Needle | 72.5 |
| 252 | " | 9 | Hetero | 79 |
| 253 | " | 0.82 | " | 73 |
| 254 | " | 0.41 | " | 65 |
| 255 | " | 0.16 | Feather | 54 |
| 270 | 1.34[a] | no water | — | (no reaction) |
| 271 | " | 27 | Needle | 40 |
| 272 | " | 2.7 | Hetero | 44 |
| 273 | " | 0.24 | Feather | 26 |
| 274 | " | 0.12 | Amorphous | 20 |
| 275 | " | 0.048 | — | trace |
| 291 | 1.34[b] | 27 | Needle | 30 |
| 292 | " | 2.7 | Hetero | 34 |
| 293 | " | 0.12 | Feather | 19 |
| 294 | " | 0.06 | Amorphous | 23 |
| 331 | 2.8[b] | no water | — | (no reaction) |
| 332 | " | 28 | Needle | 35 |

[a] $BF_3$
[b] $BF_3OEt_2$
[c] Needle: needle-like single-crystals ranging from 5 to 50 microns in length
Hetero: heterogeneous products; mixture of immature needles and other morphologies
Feather: feather-shaped and or rod-like crystals which tend to co-exist with heterogeneous and oligomeric (amorphous) products
Amorphous: amorphous products of oligomeric polymer Numbers 251, 271, 291 and 332 were in accordance with the present invention and were carried out at $BF_3/H_2O$ mol ratios of over 20. In each case, needle-like crystals were obtained. In all other cases the ratio was less than 20 and needle-like crystals were not obtained. From this it is obvious that a $BF_3/H_2O$ mol ratio of not less than 20 is a necessary condition to obtaining needle-like crystals.

What is claimed is:

1. A method of producing needle-like crystals of polyoxymethylene having a hexagonal cross-section comprising:
   dissolving purified trioxane monomer in an anhydrous nonpolar solvent and maintaining the resultant solution at a constant temperature between 30° and 65° C;
   adding one member of the group comprising boron trifluoride and its ether complex derivatives to said solution in an amount of between $2 \times 10^{-4}$ and $1 \times 10^{-2}$ mol/l thereafter adding water in an amount of between $1 \times 10^{-5}$ and $2.5 \times 10^{-4}$ mol/l so that the molar ratio of $BF_3$ to $H_2O$ is not less than 20 and homogenizing the mixture after each addition;
   maintaining the mixture unstirred at the said constant temperature, whereby producing needle-like crystals of polyoxymethylene; and
   separating said needle-like crystals as the product.
2. A method according to claim 1, wherein the nonpolar solvent is one member selected from the group consisting of pentane, hexane, heptane, octane, cyclopentane, cyclohexane, petroleum ether and ligroin.

3. A method according to claim 1, wherein the concentration of the trioxane monomer in the anhydrous non-polar solvent is 1 to 20g of trioxane monomer per 100ml of solvent.

4. A method according to claim 3, wherein the concentration of the trioxane monomer in the anhydrous non-polar solvent is 2 – 10g of trioxane monomer per 100ml of solvent.

5. A method according to claim 1, wherein the complex derivative of boron trifluoride is an ether complex derivative of boron trifluoride.

6. Needle-like crystals of polyoxymethylene having a hexagonal cross section obtained by:

dissolving purified trioxane monomer in an anhydrous nonpolar solvent and maintaining the resultant solution at a constant temperature between 30° and 65° C;

adding one member of the group comprising boron trifluoride and its ether complex derivatives to said solution in an amount of between $2 \times 10^{-4}$ and $1 \times 10^{-2}$ mol/l thereafter adding water in an amount of between $1 \times 10^{-5}$ and $2.5 \times 10^{-4}$ mol/l so that the molar ratio of $BF_3$ to $H_2O$ is not less than 20 and homogenizing the mixture after each addition;

maintaining the mixture unstirred at the said constant temperature, whereby producing needle-like crystals of polyoxymethylene; and separating said needle-like crystals as the product.

7. Needle-like crystals of polyoxymethylene according to claim 6, wherein said crystals are each 5 – 100 microns in length and 1 – 3 microns across, are hexagonal in cross-section and are constituted of molecular chains extended and aligned in the direction of length with full three-dimensional regularity.

* * * * *